Oct. 11, 1938.　　　　H. E. CLARKE　　　　2,132,721

CLUTCH CONTROL MEANS

Filed May 25, 1935　　　7 Sheets-Sheet 3

Inventor
Harold E. Clarke
By Franklin F. Phillips
Atty.

Oct. 11, 1938.  H. E. CLARKE  2,132,721
CLUTCH CONTROL MEANS
Filed May 25, 1935  7 Sheets-Sheet 7

Inventor
Harold E. Clarke
by Franklin F. Phillip
atty.

Patented Oct. 11, 1938

2,132,721

UNITED STATES PATENT OFFICE 2,132,721

CLUTCH CONTROL MEANS

Harold E. Clarke, Somerville, Mass.

Application May 25, 1935, Serial No. 23,428

4 Claims. (Cl. 192—.01)

My invention relates more particularly to clutch control means for use in connection with the main driving clutches of automobiles.

The object of my invention has been to provide a simple and effective and easily adjustable device which shall in an automatic manner, regulate the return movement of a disengaged clutch into operative engagement so that clutch engagement may be properly effected at all times to meet the requirements of varying conditions commonly encountered in automobile operation without special attention by the driver.

My said device is designed and adapted to be employed with foot pedal operated means for disengaging the clutch in the conventional manner, or with automobile means such as vacuum operated power means or any sort of automatic power means. I shall hereinafter describe and show my device in several forms including a form which may be employed when the disengagement of the clutch is effected by vacuum power means controlled by the operation of the gear shifting lever according to a particular arrangement of means which I intend to claim in a separate application later to be filed. I shall also in separate applications later to be filed claim an improved type of pneumatic valve which I herein describe and show in connection with the herein described and shown vacuum power means, and an improved type of dash-pot piston which I have herein described and shown in connection with the dash-pot device which generally considered forms an important part of my invention relating to means for the control of clutch engagement hereinafter described and claimed.

My invention may be best understood by reference to the accompanying drawings in which

Fig. 18 is a cross sectional view on line 18—18 of Fig. 17.

Fig. 23 shows in longitudinal medial cross-section a modified form of hydraulic piston with an arrangement of fluid passages whereby the hydraulic fluid may by-pass the piston, which arrangement is different from that shown in Figs. 19 and 21.

Figure 1:
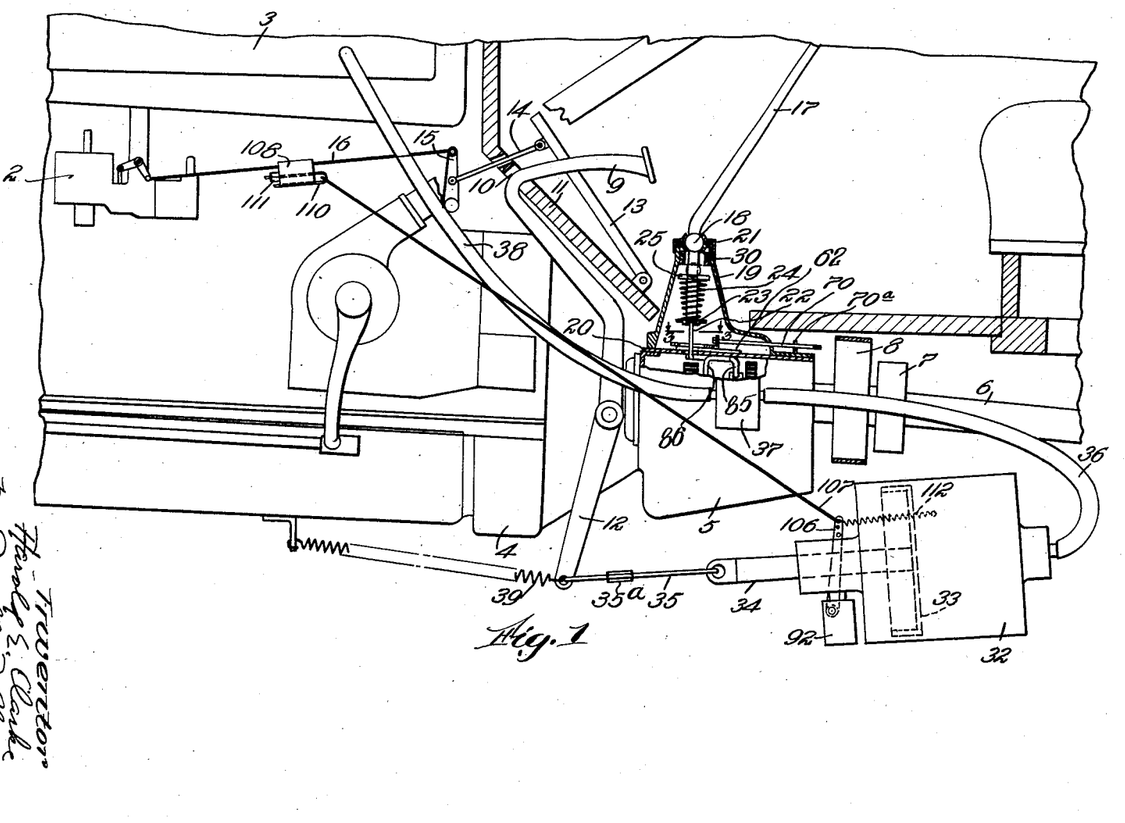
Fig. 1 is a side view of a part of an automobile showing rearward portion of the motor, the clutch housing, transmission, drive shaft and the vacuum clutch control device. The upper part of the transmission casing is shown broken away to disclose, partly in vertical section a part of my means for controlling the clutch by movement of the gear-shifting lever; and the steering post has been shown partly broken away, and the front floor board in vertical section, to disclose the carburetor control means.

Referring now more specifically to the drawings 1 is the motor, provided with a carburetor and intake manifold 3. 4 is the clutch housing, 5 the transmission casing and 6 the drive shaft provided with a universal joint 7 and the usual parking brake assemblage 8. The conventional clutch pedal arm 9 extends freely through a slot 10 in the front floor-board 11 and is provided with an extension arm 12. The accelerator pedal 13, hinged at its base to the front floor-board 11 is provided, on the under side of its top portion, with a pivotally mounted push rod 14 which is pivotally attached to an oscillating arm 15 to which is pivotally attached, at the top thereof, the throttle valve control rod 16, the forward movement of which, upon the depression of the accelerator pedal 13, opens the throttle of the carburetor 2 and accelerates the motor 1.

Figure 13:
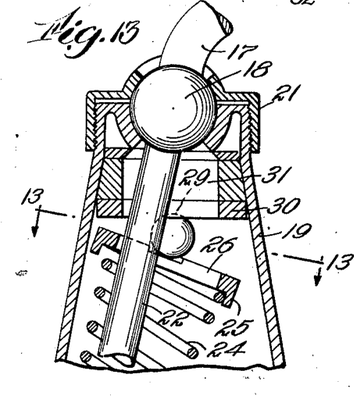
Fig. 13 shows in an enlarged medial vertical cross-section the elevated extension of the coverplate of the transmission casing, carrying the conventional ball-socket joint for the gear shifting lever therein shown with my specially mounted coil spring thereon arranged yieldingly to hold the gear shifting lever in its extreme forward or rearward positions notwithstanding counter influence to which the lever is subjected by other elements of my device.
Figure 14:
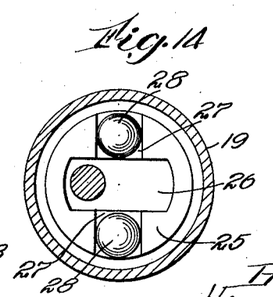
Fig. 14 is a cross-sectional view on line 13—13 of Fig. 12 showing the movable backing-plate for the coil spring shown in Fig. 12 and the balls carried thereon.

The conventional gear-shifting lever 17 carries a ball member 18 which is loosely embraced by the ball-socket housing formed by the top of the cover extension 19 of the gear-case cover 20 and the screw-cap 21 (see Fig. 13). The lower arm 22 of the gear-shifting lever 17 carries a flanged collar 23, (see Fig. 1) against which abuts the lower end of a tapering coil spring 24, the upper end of which abuts against a slotted circular plate 25 (see Figs. 13 and 14), through the slot 26 of which the lower arm 22 of the gear-shifting lever 17 loosely passes. The top face of the plate 25 is channeled by a groove 27 upon its diameter at right angles to the slot 26, on each side of which is mounted a ball 28, the top of which is retained in a slight cavity or pocket 29 in the under face of a member 30, fixed within the top of the cover extension 19 and provided with an enlarged opening 31 within which the lower arm 22 of the gear-shifting lever 17 may swing freely. The coil spring 24 is under considerable compression tension so as to keep the balls 28 within their respective sockets 29 notwithstanding the tilting of the plate 25 as the angular position of the lower arm 22 is changed in the process of gear-shifting. Since the axis of the spring, and consequently the direction of its force, assumes an angular relation to the axis of the arm 22 whenever the gear-shifting lever 17 is moved from the neutral position, it is to be noted that the force of the spring has a tendency to move the gear-shifting lever 17 toward the extreme of either its forward or backward position from neutral as the case may be when the operator is engaging a certain gear. The purpose of this function I will hereinafter explain.

Figures 2, 3, 4, 5:
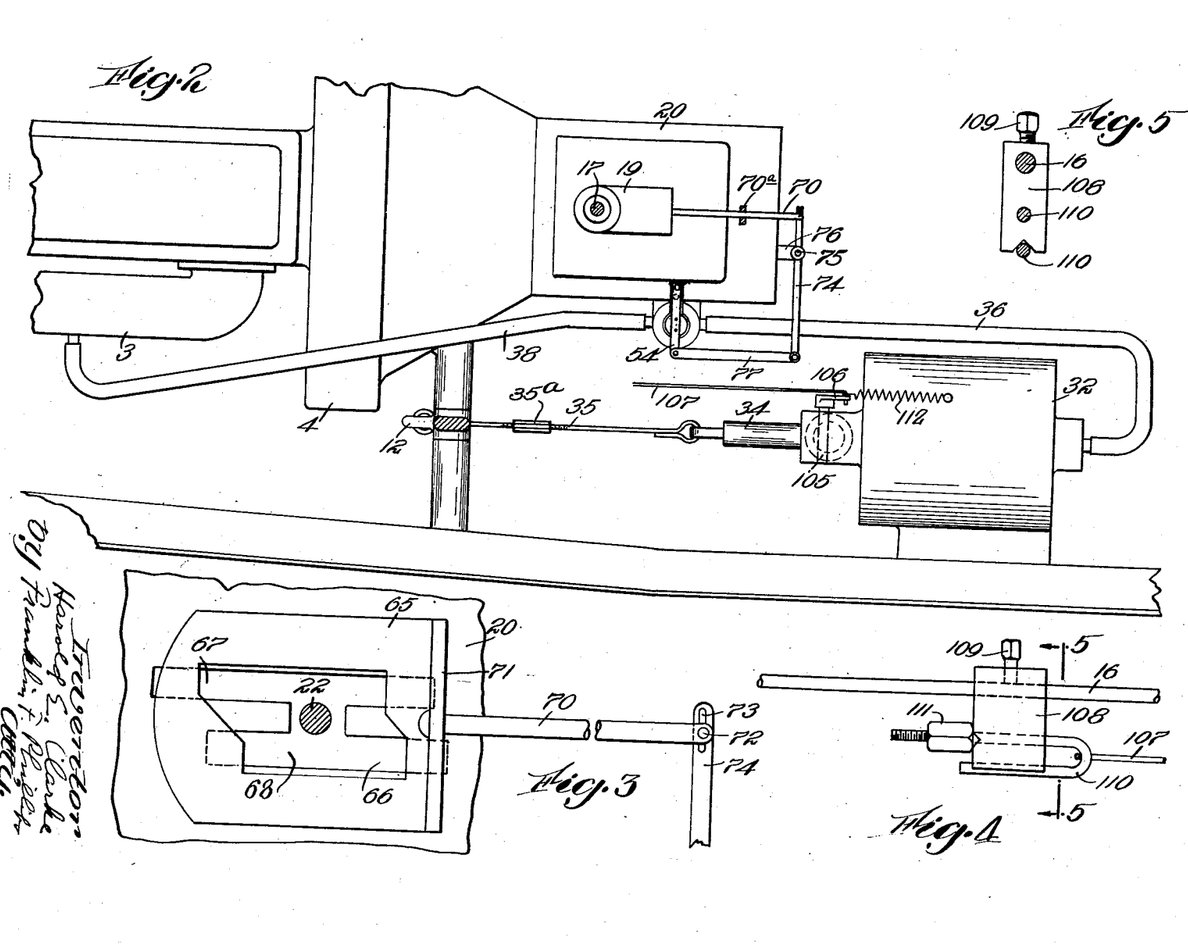
Fig. 2 is a plan view showing the top of the motor and transmission casing, the vacuum actuated clutch disengaging means, the valve for controlling the same and the arrangement of valve actuating rods or arms.
Fig. 3 is an enlarged top view of the slidably mounted valve control plate and attached parts, with the gear-shifting lever shown in horizontal cross-section in the neutral position in the crossover channel of the underlying grid plate, as viewed on line 3—3 of Fig. 1.
Fig. 4 is an enlarged side view of the adjusting means for controlling the valve which controls the limits of return of the vacuum-actuated clutch disengaging means.
Fig. 5 is a section on line 5—5 of Fig. 4.

To effect control of the clutch through the action of shifting or positioning the gear-shifting lever I have shown, and preferably employ, a vacuum-actuated cylinder 32, provided with an atmospheric port 32ª which my be attached to the side-frame of the car, as in Fig. 2, or elsewhere, and which contains a piston 33, the piston rod 34 of which is connected by the length-adjustable, rigid link 35 to the lower end of the extension arm 12 of the clutch control pedal arm 9. The back end of the cylinder 32 is connected, in the conventional manner, by a pipe 36 to a control valve means 37 which in turn is connected, by a pipe 38, with the intake manifold 3. It will be readily understood, therefore, that when the valve means 37 is so set as to subject the back part of the cylinder 32 to the influence of the partial vacuum of the intake manifold 3 the piston 33 will be retracted causing the extension arm 12 of the clutch pedal arm 9 to be oscillated backward against the yielding influence of the spring 39 thereby releasing the clutch, which may be permited to return to operative engagement under the influence of the spring when the partial vacuum in the cylinder 32 is relieved by changing the position of the valve within the valve means 37 so as to admit atmospheric pressure to the chamber of the cylinder 32 back of the piston 33.

Such clutch control means as above described and broadly viewed, are now well-known and widely in use, and I shall now proceed to describe (firstly) my improved valve means, (secondly) the mechanism for operating the same through manipulation of the gear shifting lever and (thirdly) my means for controlling the return of the clutch into operative engagement after being disengaged.

Figure 9:
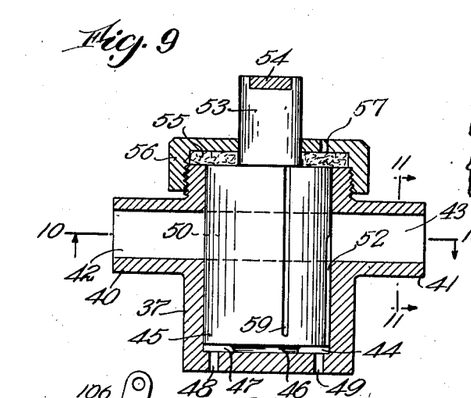
Fig. 9 is a side view of the valve shown in Fig. 7 the casing being shown in medial vertical section revealing the cylindrical rotary valve.
Figure 10:
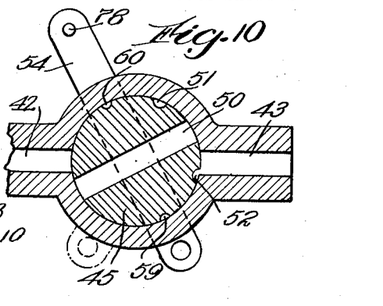
Fig. 10 is a section on line 10—10 of Fig. 9, showing, as does Fig. 9, the valve in position to admit atmospheric pressure to the vacuum chamber of the vacuum-actuated clutch disengaging means.

The valve means comprises the cylindrical casing 37 provided with opposite integral pipe connections 40 and 41 for carrying respectively the pipe 38 to the intake manifold 3, and the pipe 36 to the rear of the cylinder 32. These pipe connections 40 and 41 are provided respectively with passages 42 and 43. Within the cylindrical bore 44 of the casing of valve means 37 there is a closely fitting rotatable, cylindrical valve 45 which carries on its lower end a centrally located extension 46 of lesser diameter than the valve 45, so that there is an annular space 47 beneath the valve 45, which space communicates with the outer atmosphere through ports 48 and 49.

Figure 11:
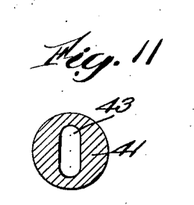
Fig. 11 is a cross-section on line 11—11 of Fig. 10 showing the narrow vertically elongated passage of the valve.

The valve 45 is provided with a transverse passage, or port, 50 which may register with the passages 42 and 43, and its cylindrical periphery is provided with two grooves or channels 51 and 52 which are located adjacent to and on either side of the end of the passage 50 which may register with the passage 43. These grooves 51 and 52 extend from the base of the valve 45 to a point sufficiently high to permit them to register with the passage 43 and thus admit atmospheric air to that passage and then to the back of the cylinder 32 whenever one of them is caused to register with that passage upon the turning of the valve 45. It will be noted from Fig. 11 that the passage 43 is elongated vertically and straight sided, rather than round so that the groove 51 or 52 may register therewith to a considerable extent quickly as said grooves are being moved into registration therewith.

The top of the valve 45 is substantially flush with the top of the casing of the valve means 37, and carries an integral central post 53 provided with a transversely mounted valve operating arm 54, which is located at right angles to the passage 50. Overlying the top of the valve 45 is a felt washer 55 which is held in place by the screw cap 56 which is screwed upon the threaded top of said valve casing. The cap 56 is provided with an oil hole 57 through which oil may be supplied to the felt washer 55 from which it may seep down along the cylindrical faces of the inside of said valve casing, and the outside of the valve 45, which is provided with grooves 59 and 60 to assist in this distribution of the oil.

Figure 6:
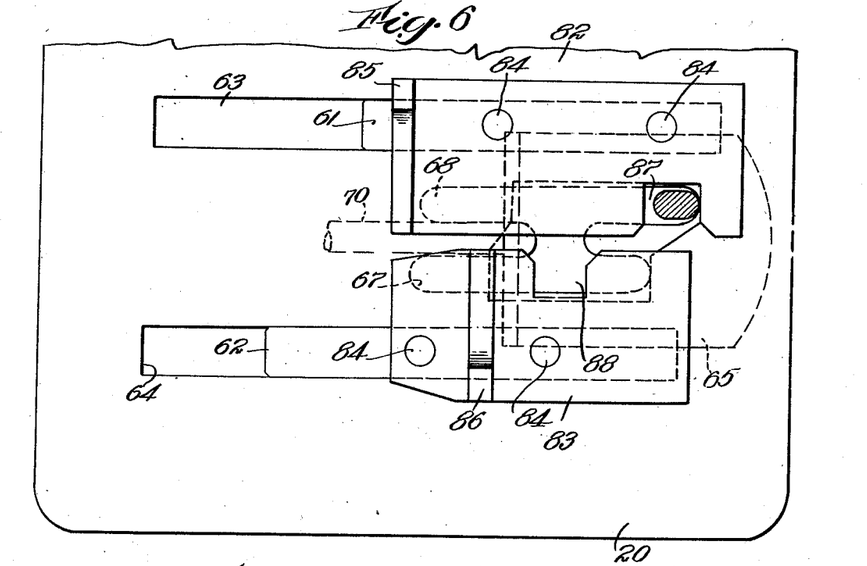
Fig. 6 is an enlarged bottom view of the grid plate in the top of the transmission casing, inverted and showing the slidable members provided with dogs for moving the gears, and means for mounting the same as in standard practice, the parts being positioned as when the transmission is in first gear, and showing also, in dotted lines, overlying the grid plate, my slidably mounted valve-control plate illustrated in Fig. 3.

To operate the valve 45 incidentally to the operation of the gear shifting lever 17 I have provided the following described structures: Slidably supported above the conventional slides 61 and 62, which are supported by the top of the cover plate 20 on the upper part of the transmission casing 5, and guided by slots 63 and 64 therein respectively, (see Figs. 3 and 6), I have provided a plate 65. The plate 65 has an aperture through which passes the lower arm 22 of the gear-shifting lever 17. It will be noted from an examination of Figs. 3 and 6 of the drawings that the opening 66 of the plate 65 is of irregular contour, its sides being parallel and its front and rear edges having staggered portions, extending at right angles to the sides, so as to extend at right angles across the longitudinal parallel slots 67 and 68 of the H shaped grid opening of the cover plate 20, which, by contact with the lower end of its arm 22 which passes through it, guides and limits the movement of the gear shifting lever 17. When the plate 65 is in the position in which it rests when the gear shifting lever arm 22 is in the neutral positions, as shown in Fig. 3, which position it then assumes automatically because of means which I shall hereinafter describe. it will be noted that the front edge overlies the longitudinal parallel slots 67 and 68 slightly to the rear of their front ends, and that the rear edge overlies said slots at substantially the same distance from rear ends of said slots. The result of the foregoing arrangement of parts is that when the arm 22 of the gear shifting lever 17 is moved, by oscillation, forwarded through the slots 67 and 68 to engage respectively the first and third speed gears, in the manner of standard practice, there is a slight forward displacement of the sliding plate 65 when it is engaged by arm 22, whereas when the said arm is moved backward through said slots, to effect the engagement of the reverse and second speed gears, there is effected substantially the same rearward displacement of the plate 65.

The plate 65 is operatively connected to the valve 45 by means of the rod 70 attached to the upturned flange 71 on the rear edge of said plate. A bracket 70a attached to the cover extension 19, forms a support for the slidable rod 70 and its attached plate 65. The rod 70 carries at its rearward end a pin 72 which loosely enters a slot 73 in one end of the lever arm 74 which is pivoted on pivot 75 on the bracket 76 attached to the back of the transmission casing 5. The other end of lever arm 74 is pivotally connected to one end of the arm 77, the opposite end of which is pivotally connected to the rear end of the control arm 54 of the valve 45.

Figure 7:
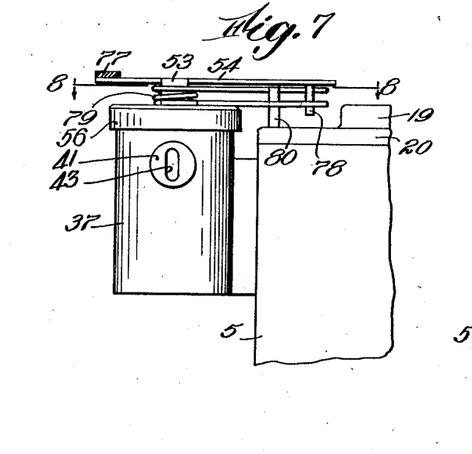
Fig. 7 is an enlarged rear view of the valve which controls generally the vacuum actuated clutch disengaging means, showing the valve actuating arm and the adjacent part of the transmission casing and the spring which controls the normal position of the valve.
Figure 8:
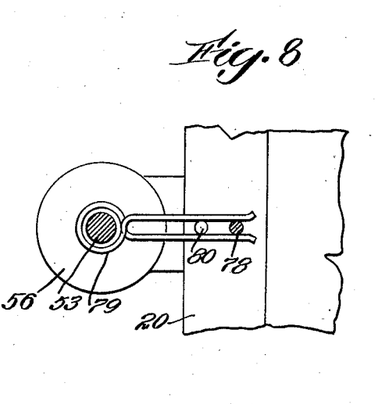
Fig. 8 is a top view on the line 8—8 Fig. 7.

The opposite end of the control arm 54 is provided with a dependent pin 78 (see Figs. 7 and 8) against which bears, on opposite sides thereof, the straight, extended ends of a coil spring 79 which embraces the top of the post 53. Between the ends of the coil spring 56 is a second pin 80 which is fixed in an upright position on the top of the gear case cover-plate 20. The tension of the spring 79 is such that its extended ends tend to bear against the pin 80 although either end may be forced outwardly from the pin 80 through the movement of the pin 78 as the arm 54 is oscillated when the arm 22 of the gear shift lever, approaching an extreme of its oscillating movement within either of the slots 67 and 68, contacts with and moves the sliding plate 65. When however the parts are in the position shown in Figs. 7 and 8 the plate 65 is yieldably retained in the neutral position shown in Fig. 3, in which position the valve 45 is so set that the valve passage 50 registers with the passages 42 and 43, thus subjecting the cylinder 32 to the influence of the partial vacuum of the intake manifold 3 so as to withdraw the clutch from engagement and hold it out of engagement. When however the plate 65 has been moved into either an extreme forward or extreme backward position, by placing the car "in gear" through moving the gear-shifting lever arm 22 into engagement with an end of one of the slots 67 and 68, a slight change of angular position of the valve 45 takes place thereby bringing either the passage 52, or the passage 51, as the case may be, into registration with the passage 43, thereby relieving the partial vacuum behind the piston 33 in the cylinder 32, so as to allow the clutch to return to operative position under the influence of the spring 39. It will be readily understood therefore that in the course of operation of the automobile, and incidentally to changing gears, the clutch is withdrawn from engagement in an automatic manner without need for the operator to perform this necessary operation by pressing down the clutch pedal.

In order to make disengagement of the clutch possible through use of the gear-shifting lever, so as wholly to eliminate the need of recourse of the clutch pedal, I have provided for a slight degree of freedom of movement of the gear-shifting lever, when it is in any gear meshing position, so that it may be moved slightly toward the neutral position without having any effect to disengage the transmission gears then in mesh as a result of having moved the lever from the limit of its oscillation permitted by an end of either of slots 67 or 68. This I have done by providing that within the sliding plates 82 and 75

83 (see Fig. 6) which are fastened by rivets 84 to the under sides of the slide members 61 and 62 respectively and provided respectively with dependent dogs 85 and 86, adapted to enter channels in the hubs of those transmission gears which they are designed to shift (according to standard and conventional practice), the recesses 87 and 88, wherein may be entered the arm 22 of the gear shifting lever 17 to effect movement of these plates, shall be of sufficient width to permit some slight free, movement of the arm 22, from the limit of a gear meshed position toward the neutral position, without sliding the plate 82 or 83 with which it is in operative relationship, so as to move the gear controlled by its movement. This free movement, however, is sufficient to permit the plate 65, which under the influence of the spring 79 always tends to follow the arm 22 in the direction of neutral position, to move sufficiently to cause the valve passage 50 to register with ports 42 and 43, thus causing clutch disengagement.

I have previously described the mounting of the spring 24 with respect to the arm 22 and the tendency of the spring yieldably to actuate the gear to assure that the arm 22 shall not be accidentally displaced from the gear-shifting position by the counterinfluence of the plate 65 under the actuating force of the spring 79. The tension of the spring 24 is made strong enough effectively to counterbalance any such action of the spring 79. If the operator, however, wishes to disengage the clutch without disengaging the gear and makes the slight movement of the gear-shifting lever toward the neutral position, as above described for that purpose, the lever will remain at the limit of its above described free movement so that the clutch will remain out of engagement notwithstanding the tendency of the spring 24 to return the arm 22 in the opposite direction since the friction of the arm 22 against the inner side of the slot 67 or 68, toward which the spring 24 tends to force it, is sufficient to hold the gear-shifting lever in the position to which it has been moved by such slight manipulation without need for the operator to hold it there.

I shall now proceed to the description of my means for regulating the return of the piston 33 thereby controlling the speed of engagement of the clutch, or timing its engagement with respect to throttle operation. The front end of the cylinder 32 (see Fig. 12) is provided with an integral boss 90 which is bored to form a bearing for the piston rod 34. On the under side of the boss 90 is a dependent integral boss 91 which has screwed into a cavity in its base the top of a dash-pot means comprising an hydraulic cylinder 92 provided with a piston assembly 93, the piston rod 94 of which passes upward through a bore in the lug 91 and carries upon its top a ball 95. The piston 34 has a cut away portion on its under side above the cylinder 92 which cut away portion has a flat surface 96 and sloping surfaces 97 and 98. A washer 99 between the top of the cylinder 92 and the base of the cavity in the bottom of the lug 91 closely embraces the piston rod 94 and prevents leakage of the hydraulic fluid for which I preferably use such a composition as is commonly used for a hydraulic brake fluid. With such fluid the cylinder 92 is filled by removal of the filler cap-screw 99a which controls a passage from the exterior to the interior of the cylinder 92.

Figure 12:
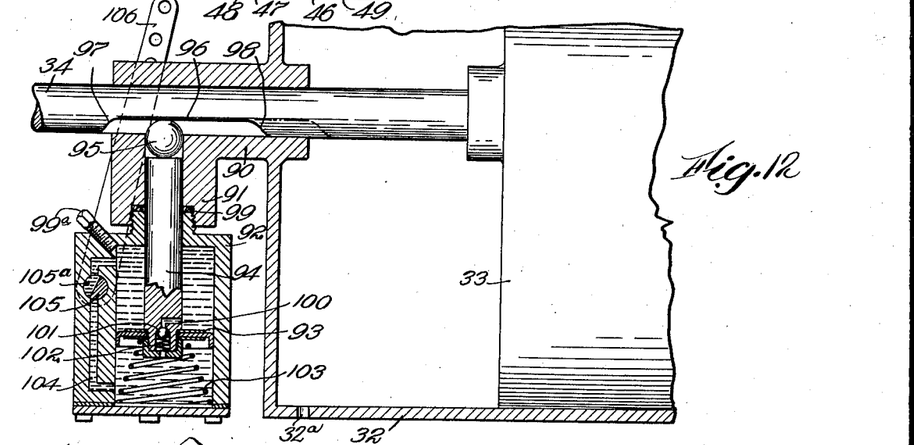
Fig. 12 is an enlarged side view of the front end of the vacuum-actuated cylinder and piston means for disengaging the clutch, showing the piston rod and control means engaging the same for regulating the return of the piston to permit clutch engagement, said control means and the front end of said cylinder being shown in medial vertical cross-section.

A rectangular passage 100 extending upward through the piston 93 and the piston rod 94 connects the chambers on each side of the piston 93. The passage 100 is controlled and closed on the downward movement of said piston by a ball check valve 101 within an enlarged part of the passage 100 located in the lower end of piston rod 94. The ball check valve 101 is yieldably seated so as to close the passage 100 by means of the coil spring 102. A second coil spring 103 is compressed between the base of the cylinder 92 and the under side of the piston 93 so that it at all times tends to force the said piston upward so as to bring the ball 95 on the top of the piston rod 94 into engagement with the piston rod 34; the by-passing of the fluid through the passage 100 freely permitting such upward movement.

A second by-passing passage 104, to permit downward movement of the piston 93 when the passage 100 will be closed by the ball valve 101, is provided in the side of the cylinder 92. This passage 104 is controlled by a rotary cylindrical valve 105 which has a diametrically cut away portion 105a affording a valve passage. The angular position of the cylindrical valve 105 is controlled by the valve control arm 106 attached thereto, which arm is controlled by a wire cable 107 attached at one end to the upper part of the valve control arm and, at the other end to the throttle valve control rod 16, (see Figs. 1, 4 and 5) which passes through a block 108 clamped thereon by the set-screw 109, which block 108 has slidably mounted therein the U shaped member 110, the position of which may be regulated longitudinally with respect to the block 108 by means of the nut 111 which screws upon the upper threaded end of the U shaped member 110 and bears against the foreward side of the block 108. The cable 107 is kept taut by the coil spring 112 (see Figs. 1 and 2) attached at one end to the top of the valve control arm 106 and at its other end to the exterior of the cylinder 32. It will be readily understood, therefore, that the spring 112 yieldably maintains the throttle valve control system at the limit of its rearward position, where it establishes an idling throttle, until the accelerator pedal 13 is depressed. Hence by turning the adjusting nut 111 and shifting the position of the U shaped member 110 with respect to the block 108 the setting of the valve 105 may be effected and its position so adjusted that when the throtle is fully retarded the valve 105 may be partly or wholly opened, or closed to an extent such that a considerable advancement of the throttle control rod 16 is necessary to bring about such rotation of the valve 105 as will bring the valve passage into registration with the passage 104 on both sides of said valve thereby permitting the by-passing of fluid around the piston 93.

It will be readily understood that the by-passing fluid through passage 104 is necessary if the piston 93 is to move downward, since in this direction of movement the passage 100 is closed by the ball valve 101, and the piston 93 must move downward when so forced by contact of the ball 95 with slanting surface 98 on the piston rod 34 when said piston rod is moving forward, to permit clutch engagement, unless said downward movement is checked by a closed condition of the by-pass passage 104 which will prevent the transfer of fluid from beneath the piston 93 to the chamber above it. Hence it will be apparent that the return of the clutch into operative engagement may be stopped definitely and abruptly when the ball 95 encounters the surface 98, provided the valve 105 is closed, or the valve 105 may be so adjusted as to be slightly opened when its control arm 106 is in the extreme of its backward position so that the fluid will by-pass slowly through said valve and permit the surface 98 to pass slowly over the ball 95 to permit final engagement of the clutch in a gradual manner quite independently of any opening movement of the valve 105 in response to movement of its control arm 106 occasioned by advancement of the accelerator pedal. As I have previously explained the opening of the valve 105 may be variously timed with respect to motor acceleration through use of the foot throttle control, so it is quite apparent that in the several ways described the return of this clutch into engagement may be variously adjusted and controlled with or without reference to motor acceleration. It is apparent however that the more abruptly and fully the motor is accelerated the more quickly the clutch will be returned to its position of engagement when it has been wholly or partly checked by the total or partial closure of the passage 104 by the setting of the valve 105, when in its normal position of rest. It is to be noted however that the ultimate outward movement of the piston rod 34 is inevitably somewhat retarded, even when valve 105 is open, as the ball 95 and the piston 93 meets the yielding resistance of the coil spring 103 and the inevitably slight resistance incidental to the transfer of liquid from beneath the piston 93 to above it. Hence the clutch can never become over-violently engaged so as to put too severe a stress upon the motor and driven parts.

Of course it will be readily understood that the limit of outward or forward movement of the piston 34 must be initially adjusted to such a position that its sloping surface 98 of the cut away portion thereof will contact the ball 95 as the clutch is very close to its position of rest at the point of firm engagement. Means for such adjustment will obviously be found in varying the length of the connecting link 35, which may be made adjustable as to length by means of the turnbuckle 35a, or the angular setting of the extension arm 12 of the clutch control arm may be made adjustable. I do not attempt to specify as desirable or ideal any state of adjustment of my specified adjustable means for controlling the return of the clutch into engagement, as it is plain that in practice many different conditions are encountered, such as variations in weight and power of cars, type and conditions of clutch, and driving habits of the operator of a particular car. I point out, however, that I have provided means for variously effecting the control of the movement of the clutch into engagement such that such movement may be closely regulated to meet the need for smooth clutch operation under a great variety of conditions.

The dash-pot apparatus and means for controlling the same to regulate the return of the clutch into engagement, such as hereinabove described, is adaptable for use in a variety of positions with slight modifications of structure and operation embodied in the example already set forth. It is obvious that it may be arranged to present its arresting or retarding influence upon any moving part which moves together with the clutch. As examples of this I have illustrated in the drawings (Figs. 15 et seq.) such control means arranged to exert its influence (1) directly upon the piston 32 of the vacuum clutch control means, and (2) upon clutch pedal arm 9.

Figure 15:
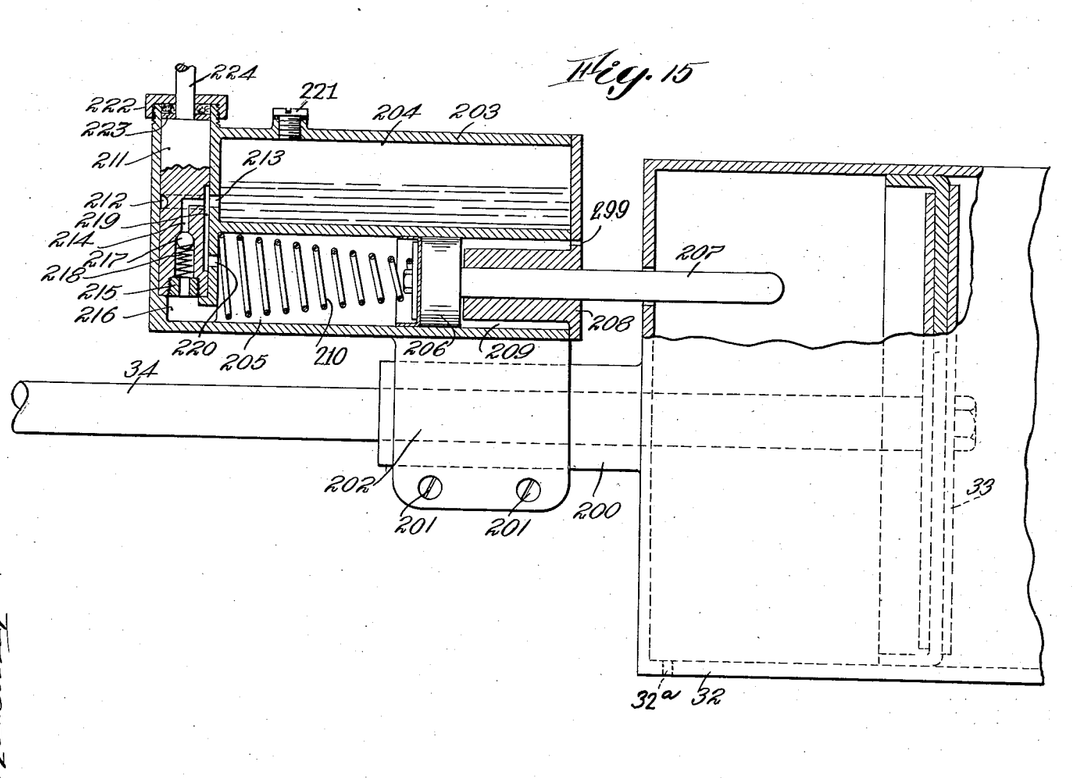
Fig. 15 shows a modified form and arrangement of the control means for regulating the return of the vacuum actuated piston whereby clutch engagement is permitted, the front end of the vacuum actuated cylinder and piston means for disengaging the clutch being shown partly broken away, and the control means being shown partly in vertical medial cross-section.
Figure 16B:
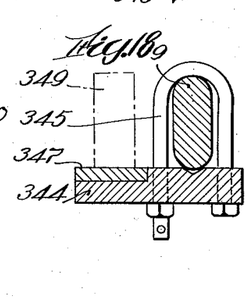
Fig. 16 is a side view of a second modified form of my means for regulating the return of the disengaged clutch into engagement, showing the same mounted on the dash-board of the automobile and provided with an oscillating arm which exerts its influence upon a platform carried on the under side of the clutch pedal arm.
Figure 17:
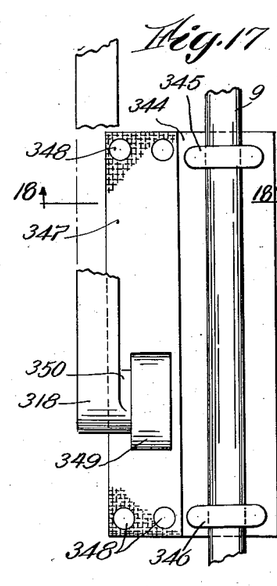
Fig. 17 is a plan view on line 17—17 of Fig. 16.

In the first of these modified forms, shown in Fig. 15, the cylinder 32 carrying the vacuum actuated piston 33 has been provided with a plain cylindrical boss 200 about which is clamped by means of screws 201 a split bracket 202 upon which is mounted, in a horizontal manner, the dash-pot member 203 which has an upper chamber 204 and a lower cylindrical chamber 205. The lower cylindrical chamber 205 contains the piston assembly 206 provided with the piston rod 207 which has a bearing in the closure cap 208 provided with an air passage 209. The piston rod 207 projects loosely through a hole in the front end of the cylinder 32 so that it may contact with the piston 33 therein. A coil spring 210 is compressed between the end of the chamber 205 and the piston 206. Closely fitting within a cylindrical chamber in the end of the dash-pot member 203 is a cylindrical valve 211 provided with an annular groove 212 which registers with a port 213 which communicates with the chamber, or reservoir 204. A rectangular passage 214 in the valve 211 communicates with the groove 212 at one extremity and at the other extremity passes through a screw plug 215 in the base of valve 211, and communicates with a passage 216 which communicates with the chamber 205. Above the screw plug 215 the passage 214 is somewhat enlarged to contain a ball check-valve 217 which is yieldably held seated by the coil spring 218 the base of which bears on the top of the screw plug 215 and the top of which bears against the ball check valve 217. A vertical groove or channel 219 in the cylindrical surface of the valve 211 will, upon an appropriate positioning of the valve 211 bring the port 213 into communication with the port 220 of the chamber 205 thus permitting the transfer of liquid from that chamber to the reservoir 204, both of said chambers being filled with a suitable liquid through the filling aperture normally kept closed by the screw cap 221.

The valve 211 is held against vertical displacement by the screw-cap 222 which holds in place a packing washer 223 which surrounds the valve step 224 which passes loosely through the screw cap 222. It will be readily understood that the valve 224 is designated to carry a control arm connected and actuated in a manner such as is the control arm 106 which regulates the dash-pot means 92 previously described, that the dash-pot member 203 will function to attain the same general functional objects as above-described in connection with dash-pot means 92.

A third form, or second modified form, of arrangement of the dash-pot control means for regulating the return of the clutch into engagement is that illustrated in Figs. 16 to 22, inclusive, of the drawings which show the dash-pot casing 301 mounted by means of the bolt 302 upon the forward side of the front body-wall 303 of the automobile. The dash-pot casing 301 has a lower cylindrical chamber 304 (see Figs. 19, 20 and 21) carrying an elongated solid piston 305 the surface of which is provided with eight longitudinal grooves 306 equally spaced, and an upper chamber 307 which communicates with the cylindrical chamber 304 by a horizontally elongated passage 308.

Figures 19, 20, 21, 22:
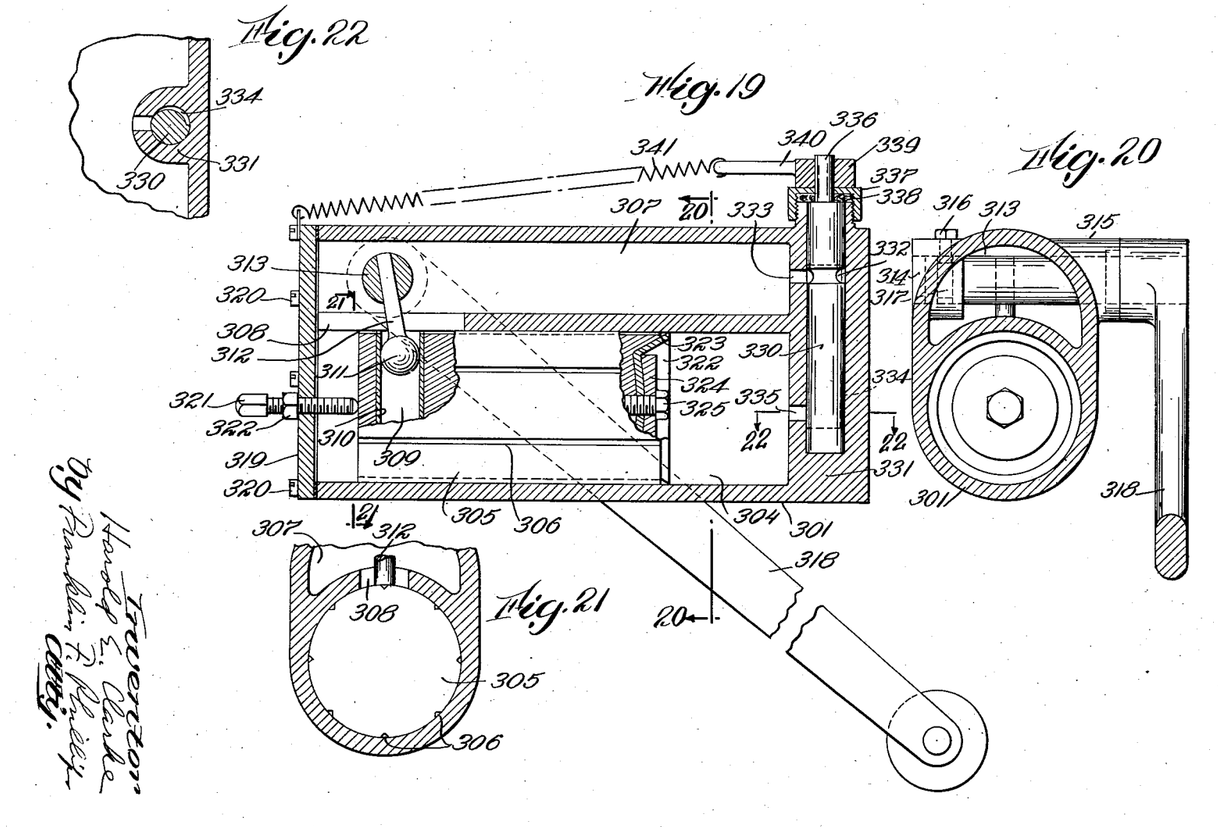
Fig. 19 is a medial longitudinal vertical sectional view of the hydraulic cylinder and piston means for regulating the return of the disengaged clutch into engagement employed in the modified form shown in Fig. 16.
Fig. 20 is a cross-sectional view on line 20—20 of Fig. 19 showing the means for mounting the oscillating arm.
Fig. 21 is a cross-sectional view of line 22—22 of Fig. 19 showing the arrangement of fluid passages whereby the hydraulic fluid may by-pass the piston shown in Fig. 19.
Fig. 22 is a cross-section on line 22—22 of Fig. 19.

The front end of the piston 305 is provided with a diametrically located cylindrical bore 309 which is lined by a hardened steel tube 310 affording a suitable bearing surface for a ball 311 on the end of an integral piston rod 312 which enters and is secured in a cylindrical shaft 313 which is transversely mounted in opposite lugs 314 and 315 integral with the dash pot casing 301. A bolt 316 passes through the lug 314 and enters an annular channel 317 in the shaft 313, thus retaining said rod against longitudinal displacement. Attached to the end of the shaft 313 is an arm 318.

The front end of the dash-pot casing 31 is closed by a detachable cover-plate 319 secured by screws 320. Screwed through a hole in the cover-plate 319 is a bolt 321, carrying a locking nut 322, by which bolt may be adjustably determined the limit of forward movement of the piston 35.

The rearward end of the cylinder 305 has a circular recessed portion 322 which tapers from the adjacent edge of said piston toward its axis (see Fig. 19) thus forming a seat for the flexible washer 323 which is held in place therein by the circular plate 324 secured in the end of the piston 305 by the screw bolt 325. The edge of the washer 323 overlies the adjacent ends of the grooves 306 so as to close the same to the passage of liquid when the piston is moved to the rear thereby creating pressure on the outer face of said washer, which washer may collapse inwardly in response to liquid pressure in said grooves 306 when said piston is moved in the opposite direction so that liquid may by-pass said piston through said grooves.

The piston 305 may also be by-passed through passages controlled by the cylindrical valve 330 rotatably mounted in the cylindrical bore of a boss 331 integral with the rear end of the dash-pot casing 301 and provided with an annular groove 332, which registers with a port 333 in said boss, which port communicates with the chamber of reservoir 307. The face of the valve 330 is reduced or cut away on a part of its circumference (see Fig. 22) to provide a passage 334 connecting the passage formed by said annular groove 332 and the port 335 which communicates with the cylindrical chamber 304.

The valve 330 is provided with an integral axial turning post 336 projecting loosely through a cap 337 screwed upon the threaded top of the boss 331 and tightly engaging a packing washer 338. On the upper end of the turning post 336 is attached a hub 339 which carries a transverse control arm 340 to one end of which is attached one end of a coil spring 341 the other end of which is fastened to the casing 301 which coil spring yieldably holds the valve 330 in closed or very slightly open position; from which position it may be moved to the open position by the pull of the cable 342 which is attached to the opposite end of the control arm 340 and to a U shaped member 342a adjustably mounted in an upright block 343 attached to the throttle valve push rod 16, which U shaped member and block generally resemble the dependent block 108 and U shaped member 110 previously herein described and function in a similar manner.

To operate the dash-pot piston 305, so that it may respond to movement of the clutch control pedal arm 9, I have provided contact means for the arm 318, which oscillates in response to movement of the piston 305, and the clutch control pedal arm 9 as follows: that part of the arm 9 which underlies the front floor board 11 has been provided with a parallel, dependent, wooden platform (see Figs. 17 and 18), attached thereto by a pair of U shaped clamping bolts 345 and 346 which embrace the arm 9 and pass downwardly through the said platform adjacent one side thereof. The surface of the other side of said platform is preferably covered by a strip of material such as brake lining 347 attached by screws 348 to form a suitable tracking surface for the roller 349 which is mounted in a boss 350 on the end of the arm 318. A coil spring 351, attached at its upper end to the arm 318, and at its lower end to the bottom of one leg of the U shaped clamping bolt 345, yieldably holds the roller 349 in contact with the bearing surface 347 of the platform 344. A coil spring 352 attached to one end to the clutch pedal arm 9 and at the other end to the transmission casing 5 tends normally to hold the clutch pedal arm in its retracted position of clutch engagement.

Fig. 23 shows a modified form of the piston 305. The piston 305a is hollow, instead of solid, and a front end partition 305b is provided with ports 306a which correspond in function to the grooves 306 in the solid piston 305. It will be noted from the drawings that the rearward end of the piston 305a is recessed in the same manner as piston 305, and carries a similar flexible washer 323a retained by a circular plate 324a held by a screw bolt 325a, and a transverse tubular insert 310a engages the ball 311 on the end of the oscillating piston rod 312.

From the foregoing description of the dash-pot means embodied in the modified form shown in Figs. 16 to 23 inclusive, and the described means of their connection to the clutch pedal arm it will be readily understood that as the clutch pedal is depressed the arm 318 will follow the clutch pedal arm 9 downward with the roller 349 in contact with the platform 344 until the arm 318 has reached the limit of its downward motion established by the engagement of the piston 305 with the end of bolt 321, after which time the pedal arm may be further depressed, against the yielding resistance of the coil spring 351, but the roller 349 will lose its contact until the clutch pedal is released when the returning arm 9 will bring its attached platform 344 again into contact with the roller 349 thereby elevating the arm 318 against the resistance of the dash-pot means which will check it wholly, or in part, depending upon the prearranged angular positioning of the valve 330 attained by means of adjusting the slidable U shaped member 342 associated with the throttle valve control rod 16 to which member is attached the cable 342 running to the valve control arm 340,—the valve 330 being arranged and controlled to function generally in this respect in the same manner as previously set forth with respect to valves 105 and 211, not only with respect to the normal positioning of the valve 330 but also with respect to its opening in response to movement of the throttle valve control rod to cause motor acceleration.

It will be understood, of course, that the point of interposing the check of the dash-pot means upon the movement of the clutch towards its position of final engagement may be very precisely determined by the setting given the adjusting screw 321 which limits the forward movement of the piston 305 and hence determines the angular position of the arm 318 and the time when it is first subjected to the influence of the rearwardly returning clutch pedal arm 9.

Figure 24:
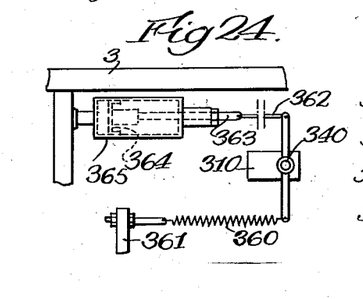
Fig. 24 is a diagrammatic view illustrating the control of the valve for the dash-pot means by a piston acted upon by the vacuum in the intake manifold of the engine.
Figure 25:
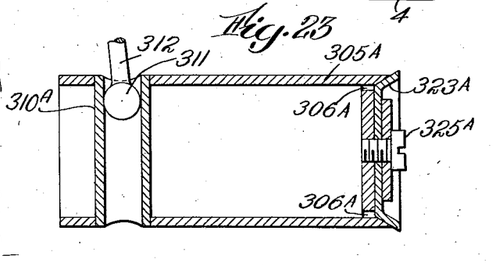

The control valve of the dash-pot instead of being mechanically connected to the throttle control means may be actuated by vacuum derived from the intake manifold, as illustrated in Fig. 24. The dash-pot casing 301, the same as in Fig. 19, has a control arm 340 for moving the valve. The arm 340 is moved in one direction by the spring 360 which is connected at one end to a fixed bracket 361 and at its other end to one end of the lever 340. The opposite end of the arm 340 is connected by cable 362 to the rod 363 of a piston 364 slidable in cylinder 365. A connection 366 is provided between the intake manifold 3 of the engine and the cylinder 365. It is obvious that the piston will be moved to the left when the depression in the intake manifold pressure is sufficient to overcome the force of spring 360. The action will be more or less responsive to the movement of the throttle. If the throttle is opened for rapid acceleration, the intake manifold pressure will rise and the spring 360 will pull the piston back and open the valve in the dash-pot casing. If the throttle is closed to idle position the piston 364 will be moved to close the valve.

It will be readily apparent from the foregoing that my device not only adds greatly to the convenience of driving an automobile by eliminating the need of clutch pedal operation by the driver when shifting gears, and upon other necessary occasions when a slight movement of the gear-shift lever will suffice to disengage the clutch, but also serves to ensure a proper clutch engagement on the many occasions when even a skilled and careful driver will inadvertently place undue stress upon the motor and power transmission elements of the automobile by too abruptly permitting clutch engagement in the presence of considerable engine speed. Thus the fallible human element is largely eliminated from clutch control incidental to automobile operation thereby affording much protection to many elements of the automobile mechanism by the timely and proper release and engagement of the clutch.

It will be readily understood also that many changes and modifications of my above disclosed means may be made without departing from the principle of operation of my device which is to provide a power operated means for disengaging the clutch the control element of which is governed through that movement of the gear shifting lever which is employed in gear shifting operations, and which is, further, to provide a liquid containing dash-pot means to check and regulate the return movement of mechanism moved initially to effect clutch release, the resistance of which dash-pot means is controlled by means activated by throttle operation.

Although in the form of my invention specifically herein above described I have referred to movement of the gear shifting lever to move gears into or out of meshed relationship it is to be understood that the operating principle is unchanged when that type of transmission is employed wherein the gears are maintained in mesh and the so-called "gear shifting lever" corresponding to the old conventional type, engages or disengages clutches associated with certain gears to bring about the same effective gear operating results as obtained in the case of the old standard practice, and wherever in the following claims I refer to the "meshing" or "unmeshing" of gears or "gear shifting" I am to be deemed to intend by such language either form of gear operation.

I claim:

1. In a device of the character specified the combination of a clutch, a member connected therewith and movable in response to the movement thereof into and out of engagement, a liquid containing dash-pot means provided with an escape passage from its compression chamber arranged to engage said member and present resistance to the movement thereof toward the clutch-engaged position, a valve adapted to control said escape passage of said dash-pot means, an engine throttle and means operable upon the opening of said throttle to open said valve.

2. A device of the character specified according to claim 1 in which the means operable upon the opening of the throttle to open the valve comprise a valve control arm, and a member connecting said arm with the throttle actuating means whereby the movement of said throttle actuating means in the direction of opening the throttle may open the valve.

3. In a device of the character specified, the combination of a clutch, a member connected therewith and movable in response to the movement thereof into and out of engagement, a liquid dash-pot mechanism operatively connected with said member and adapted to present resistance to the movement of the member toward the clutch engaged position, the dash-pot mechanism having an escape passageway from its compression chamber, a valve for controlling the passage of liquid through said passageway, an engine throttle, means operatively connecting the engine throttle to said valve whereby the movement of said throttle actuating means in the direction of opening the throttle will open the valve, and a spring operatively connected to said valve to yieldingly hold the same at the limit of its position for restricting the flow of liquid through said passageway.

4. In a device of the character specified, the combination of a clutch, a member connected therewith and movable in response to the movement thereof into and out of engagement, a liquid containing dash-pot means provided with an escape passageway from its compression chamber and operatively connected to said member to present resistance to the movement thereof toward the clutch engaged position, a valve adapted to control said escape passageway, means for causing acceleration of the engine, and means operatively connected with the last mentioned means for moving the control valve of the dash-pot means to cause a more rapid clutch engagement as the engine is accelerated.

HAROLD E. CLARKE.